No. 677,236. Patented June 25, 1901.
G. J. KENNEDY.
WATER COOLING TOWER.
(Application filed Feb. 16, 1901.)
(No Model.)
2 Sheets—Sheet 2.
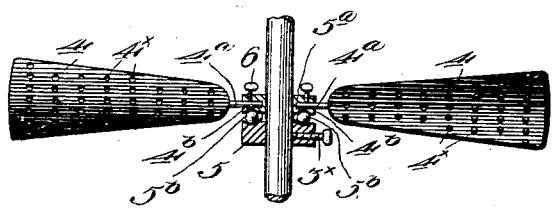
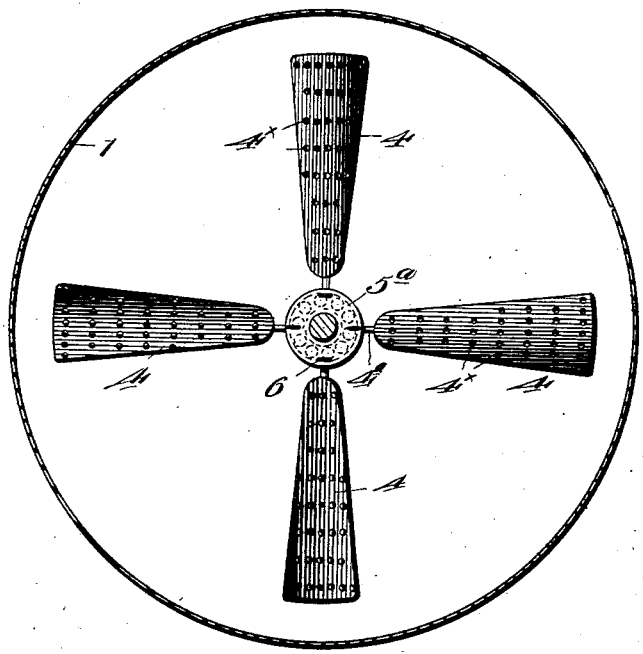
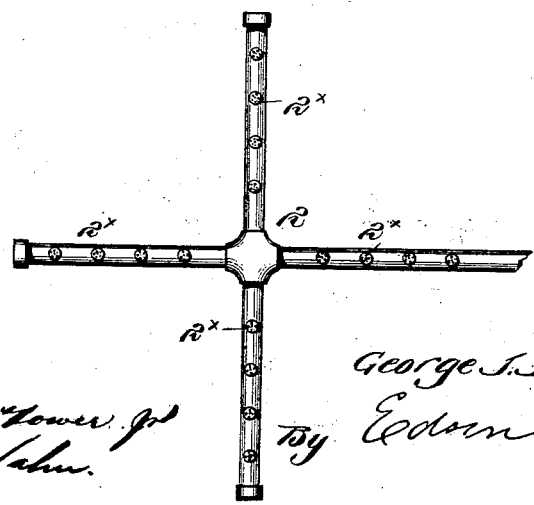
Witnesses
Inventor:
George J. Kennedy
by Edson Bros,
Attorneys

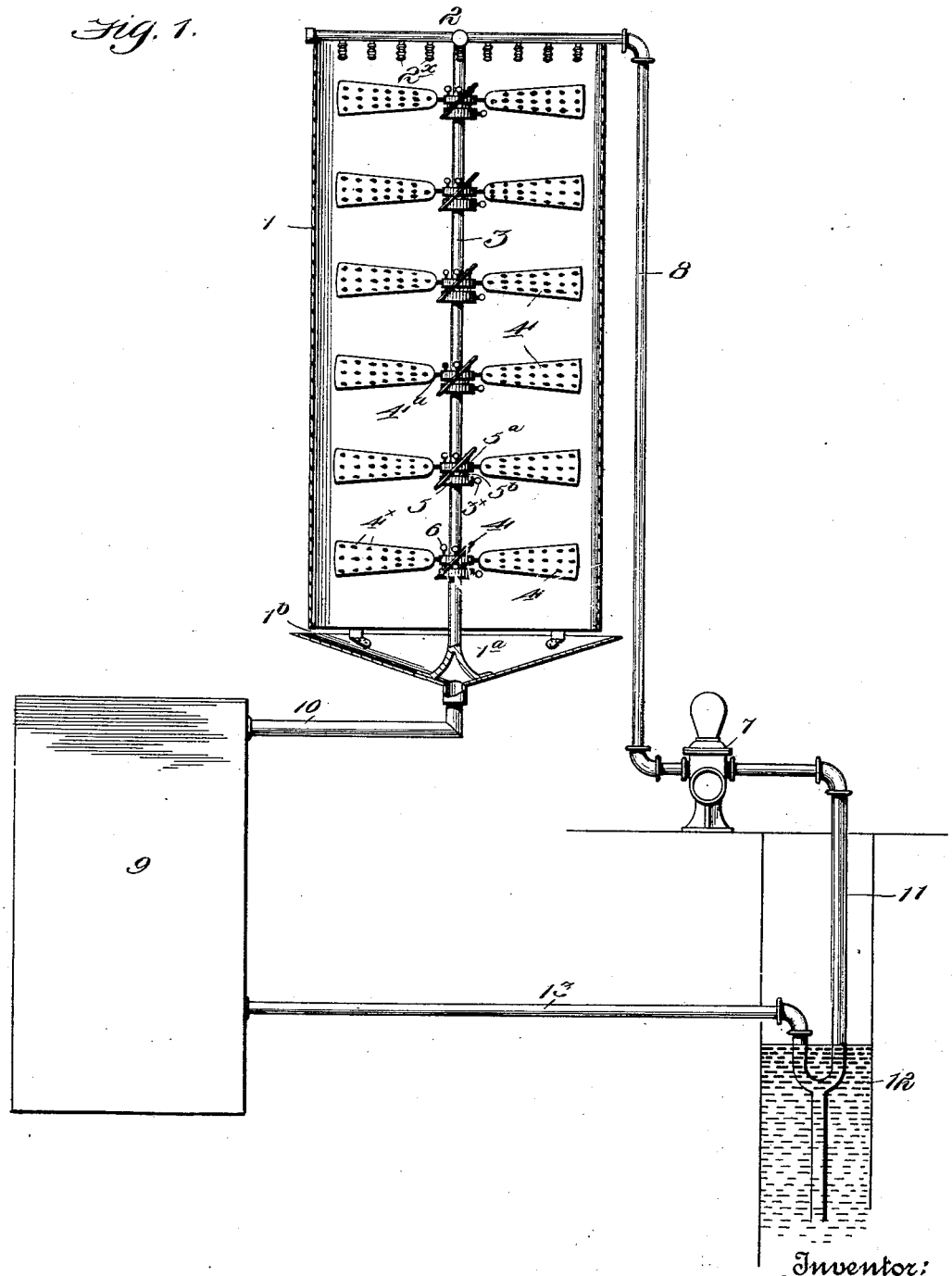

UNITED STATES PATENT OFFICE.

GEORGE J. KENNEDY, OF BALTIMORE, MARYLAND.

WATER-COOLING TOWER.

SPECIFICATION forming part of Letters Patent No. 677,236, dated June 25, 1901.

Application filed February 16, 1901. Serial No. 47,618. (No model.)

*To all whom it may concern:*

Be it known that I, GEORGE J. KENNEDY, a citizen of the United States, residing at Baltimore, in the State of Maryland, have invented certain new and useful Improvements in Water-Cooling Towers; and I do hereby declare the following to be a full, clear, and exact description of the invention, such as will enable others skilled in the art to which it appertains to make and use the same.

My invention relates to certain improvements in apparatus or systems which may be termed "water-cooling towers."

The invention is particularly designed for artificially lowering the temperature of the water after use, for instance, in an ice-condenser, which would otherwise be wasted, and reusing said water, it being taken therefrom and forced to a desired altitude under great pressure, as presently disclosed, sprayed or delivered up into small particles, and while being subjected to the action of induced cold-air currents, to aid the thorough and expeditious exhaustion or elimination of caloric from the water, is caused to pass through numerous openings in means presently described, additionally comminuting the sprayed water to assist the complete depletion of the caloric. Also the thus finely-divided-up water is spread or intercepted at intervals in its descent or precipitation, thus retarding its passage, to still more intimately or thoroughly expose the water to the action of the cold-air currents, and finally delivered in a cooled condition for reuse, as aforesaid.

The invention, generally stated, consists principally of a series of angularly-adjustable blades or arms adapted to comminute or permit the passage therethrough of the water, of such a series of blades adapted to be rotatable or movable under the action of cold-air currents induced by the lowering of the temperature in the tower or inclosure resulting from the falling water therein and to effect the spreading of the water, and consequently the retardation of its passage through said inclosure, of the combination, with said blades or arms, of a water-spraying device and means for forcing or elevating the water to said spraying device, and of details of the construction, combination, and arrangement of the parts, substantially as hereinafter more fully disclosed, and specifically pointed out by the claims.

In the accompanying drawings, illustrating the preferred embodiment of my invention, Figure 1 is a view, partly in section and partly in side elevation, thereof. Fig. 2 is a detailed vertical section showing more particularly the roll or ball bearings of the bearing-boxes carrying the blades or arms. Fig. 3 is a cross or horizontal section of the same. Fig. 4 is an inverted detailed plan view of the spraying device.

Latitude is allowed herein as to details, as they may be changed or varied at will without departing from the spirit of my invention and the same yet remain intact and be protected.

In carrying out my invention I suitably mount or support upon a closure or tower 1, at its top, a water-spraying device 2, which may consist of a number of radial or crossing pipes having depending nozzles $2^\times$ of any desired or approved construction to spray the water into said closure or tower. Within said tower is suitably secured or fixed a shaft 3, and upon this shaft are arranged series of blades or arms 4, two or more of which may be connected to each bearing-box, presently referred to. Said blades or arms have each a shank or rod extension $4^a$ at its inner narrow end inserted or let into a corresponding socket $4^b$ of the freely-turning upper half or section $5^a$ of a box or support 5, suitably fixed or held upon the shaft 3 by set or holding screws $3^\times$. Each blade or arm is adjustably held in place by a set or holding screw 6, working in the movable or turning section $5^a$ of a box or support 5 and engaging the rod extension or shank of such blades, whereby said blade or arm may be so disposed or adjusted as to most advantageously present it to the direction of movement or passage of the induced air-currents set up within said closure or tower. Each blade has also numerous or multiplicity of holes or perforations $4^\times$ therethrough to provide for further comminuting or breaking up the water precipitated or sprayed from the nozzles of the spraying device 2 to additionally expose the particles of water to the cooling action of the induced cold-air currents within the closure or "tower." The blades or arms themselves have the effect to intercept or spread the falling water, and thus retard its passage through the tower or closure to provide for the protracted exposure of the water to the cooling action of the induced cold-air currents. Also by the movement of the blades or arms the water received or falling thereon is further retarded in its descent, having the effect to further protract the exposure of the water to the action of the cold-air currents within the closure or tower.

The bearing-boxes 5 contain balls or spheres 5$^b$, upon which rest and turn the box-sections 5$^a$ to render sensitive the action of the blades or arms to the air-currents in the tower and to reduce friction, as will be readily appreciated.

The water to be sprayed or precipitated into the tower or closure 1 from the spraying device 2 is forced or delivered from a steam or hydraulic pump through a pipe 8 connecting with said spraying device and pump. The water cooled in the tower or closure is conducted therefrom and passed to and reused in a condenser 9 through a pipe 10, connecting with a centrally tapered or sloped bottom 1$^a$ of said tower, having a central opening through which the water passes into said pipe, said pipe also connecting with said condenser. The bottom 1$^a$ is connected to the lower end of said tower or closure suitably to provide an air-passage 1$^b$ therebetween for aiding the air circulation.

The steam or hydraulic pump 7 has connected thereto a supply-pipe 11, dipping, preferably, into a sunken reservoir or well 12, said pipe also having an arm or extension 13, connecting with the condenser 9 near its bottom, to discharge or drain the waste water from said condenser to the well or reservoir, permitting the reusing of the water, as above stated.

Having thus fully described my invention, what I claim, and desire to secure by Letters Patent, is—

1. Apparatus of the character described having series of blades connected up in pairs, each pair being independently movable, a stationary shaft, freely-turning box-sections, each carrying a pair of blades and means fixed to said shaft, forming supports for said freely-turning box-sections, substantially as set forth.

2. Apparatus of the character described, comprising a "tower," a stationary shaft arranged therein, pairs of blades provided with numerous or multiplicity of holes, a freely-turning box-section for each pair of blades and a fixed box-section for each freely-turning box-section applied to said stationary shaft and means for spraying water in said tower, substantially as set forth.

3. Apparatus of the character described, comprising a "tower" or closure, a centrally-sloped bottom at the lower end of said "tower," a spraying device at the top of said "tower," a stationary shaft arranged centrally within said "tower," a series of perforated blades, arranged in pairs, freely-turning box-sections each carrying a pair of said blades, fixed box-sections connected to said stationary shaft and forming supports for said freely-turning box-sections, a steam-pump having pipe connection with said spraying device, and a condenser having pipe connection with the bottom of said "tower," said pump having a supply-pipe, dipping into a reservoir, and a pipe arm or extension connecting with said condenser, near the bottom, receiving the waste water from said condenser, substantially as set forth.

4. Apparatus of the character described, comprising a "tower" or closure, a centrally sloped or tapered bottom arranged at the lower end of said "tower" or closure, a spraying device arranged at the top of said "tower" or closure, a fixed shaft arranged centrally within said "tower" and a series of perforated blades or arms movable around said shaft, a steam or hydraulic pump having pipe connection with said spraying device, and a condenser having pipe connection with the bottom of said "tower" or closure, said pump having a supply or feed pipe, dipping into a reservoir, and an arm or extension connecting with said condenser, near the bottom, receiving the waste water from said condenser, substantially as set forth.

In testimony whereof I affix my signature in presence of two witnesses.

GEO. J. KENNEDY.

Witnesses:
C. EDWIN LEACH,
F. C. SMITH.